April 4, 1961 J. J. PAKAN 2,978,702
ANTENNA POLARIZER HAVING TWO PHASE SHIFTING MEDIUM
Filed July 31, 1957 3 Sheets-Sheet 3

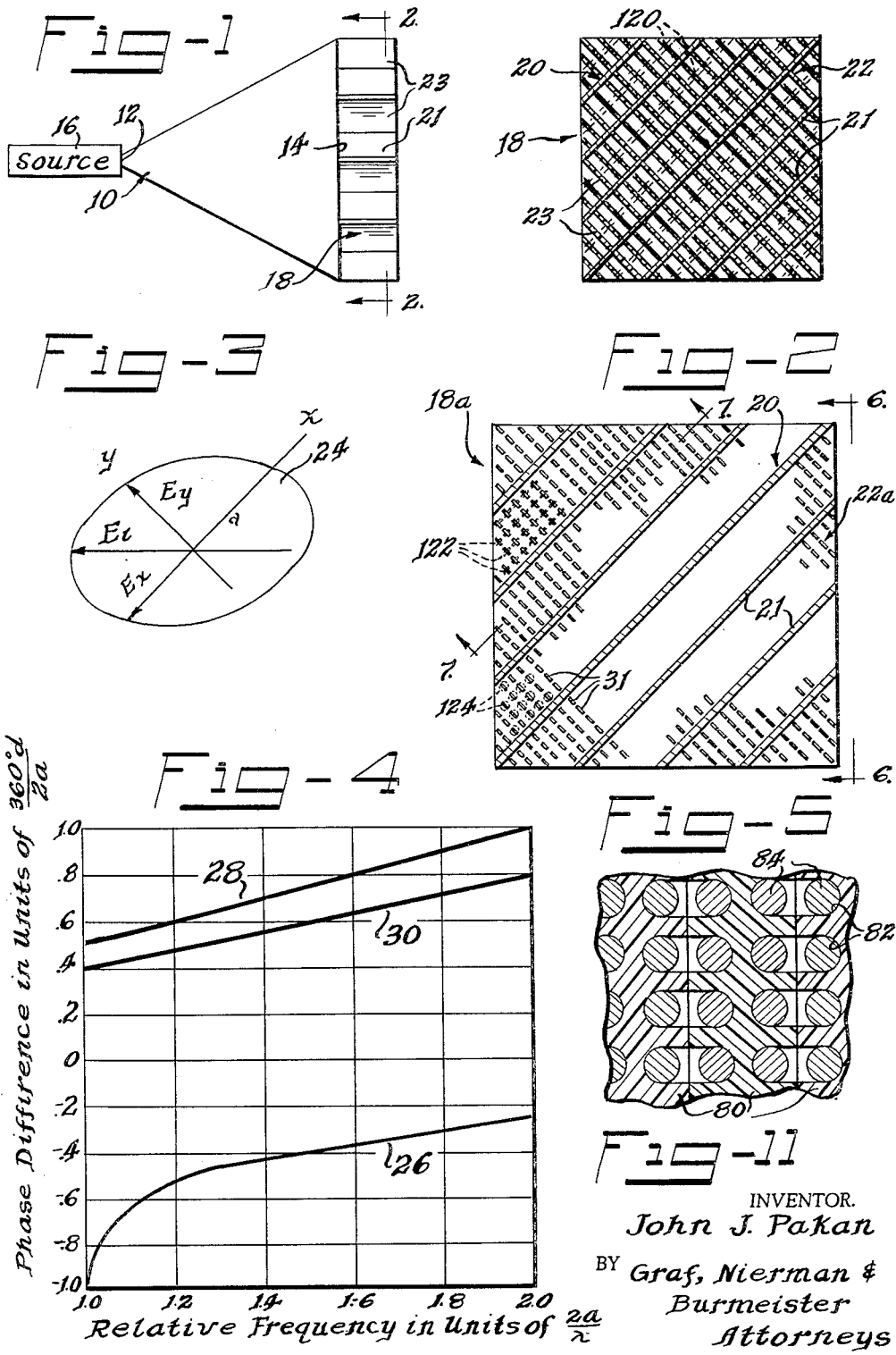

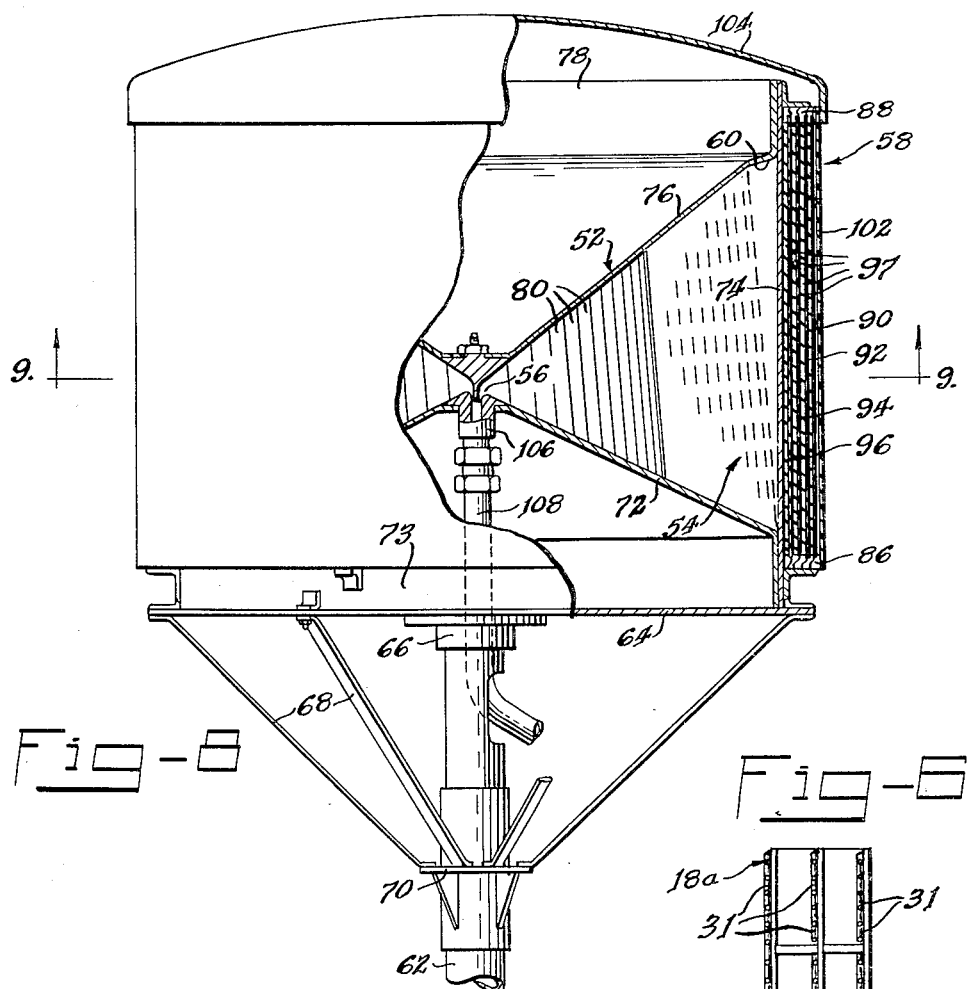

INVENTOR.
John J. Pakan
BY Graf, Nierman &
Burmeister
Attorneys

United States Patent Office 2,978,702
Patented Apr. 4, 1961

2,978,702

ANTENNA POLARIZER HAVING TWO PHASE SHIFTING MEDIUM

John J. Pakan, Elmwood Park, Ill., assignor to A.R.F. Products, Inc., River Forest, Ill., a corporation of Illinois Filed July 31, 1957, Ser. No. 675,414

15 Claims. (Cl. 343—753)

The present invention relates to microwave polarizers, and to antennas employing such polarizers.

It is often desirable to propagate or receive radiation polarized in a particular manner. Under some circumstances this may be conveniently accomplished by constructing an antenna which is adapted to radiate and receive electromagnetic waves polarized in a different manner than ultimately desired. An elliptically polarized electric field, including limiting cases of linear and circular polarization, may be resolved into equal quadrature components in space by proper selection of the coordinate axes of the component vectors. The polarization of the field is a function of the electrical phase difference between the components. Hence, it is possible to employ a polarizer to shift this phase difference of the electromagnetic waves to produce the desired polarization. Certain media, here referred to as anisotropic media, will transmit these different quadrature field components at different velocities if the media are properly oriented with respect to the coordinate axes, that is, the media exhibit different refractive indices for the quadrature field components. The velocity difference through the anisotropic medium in the direction of propagation alters the electrical phase relation between the quadrature field components, thereby changing the polarization of the field.

Two general types of media with anisotropic refractive indices are known. One is composed of a plurality of spaced electrical conducting sheets, also referred to as a "metal plate" media, and exhibits a refractive index below unity for electric fields propagated between the sheets with the electric vector parallel to the sheets. The second type of medium having anisotropic refractive indices is referred to as a dielectric anisotropic medium. It may comprise an array of spaced dielectric sheets disposed parallel to the direction of propagation and exhibits a refractive index above unity for electric fields propagated between the sheets with the electric vector parallel to the sheets. It may also comprise certain kinds of anisotropic dielectric media, such as a lattice of short conductors employed to produce the anisotropic properties, as will be further described.

Both the spaced conductor media and the dielectric media introduce phase differences which are functions of frequency, limiting their application to a narrow frequency band. It is one of the objects of the present invention to provide a phase shifter which is suitable for operation over a wider frequency range than previous phase shifters.

It is also an object of the present invention to provide an antenna employing a horn and a polarizer which is suitable for operation over a wider frequency range than has heretofore been practical.

Many additional objects and advantages of the present invention will become apparent to those skilled in the art from a further reading of this disclosure, particularly when viewed in the light of the drawings, in which:

Figure 1 illustrates an antenna with a polarizer constructed according to the teachings of the present invention;

Figure 2 is a sectional view taken along the line 2—2 of Figure 1;

Figure 3 is an electrical vector diagram illustrating the phase shift accomplished by the phase shifter of the antenna illustrated in Figures 1 and 2;

Figure 4 is a graph showing the relation of the phase difference to the relative frequency of anisotropic electrical conductor media and anisotropic dielectric media;

Figure 5 is an elevational view of a modified form of phase shifter taken on a plane similar to that of Figure 2;

Figure 6 is an elevational view of the phase shifter taken along the line 6—6 of Figure 5;

Figure 7 is a sectional view taken along the line 7—7 of Figure 5;

Figure 8 is an elevational view, partly in section, of an omnidirectional antenna constructed according to the teachings of the present invention;

Figure 11 is a sectional view taken along the line 11—11 of Figure 9; and

Figure 9:
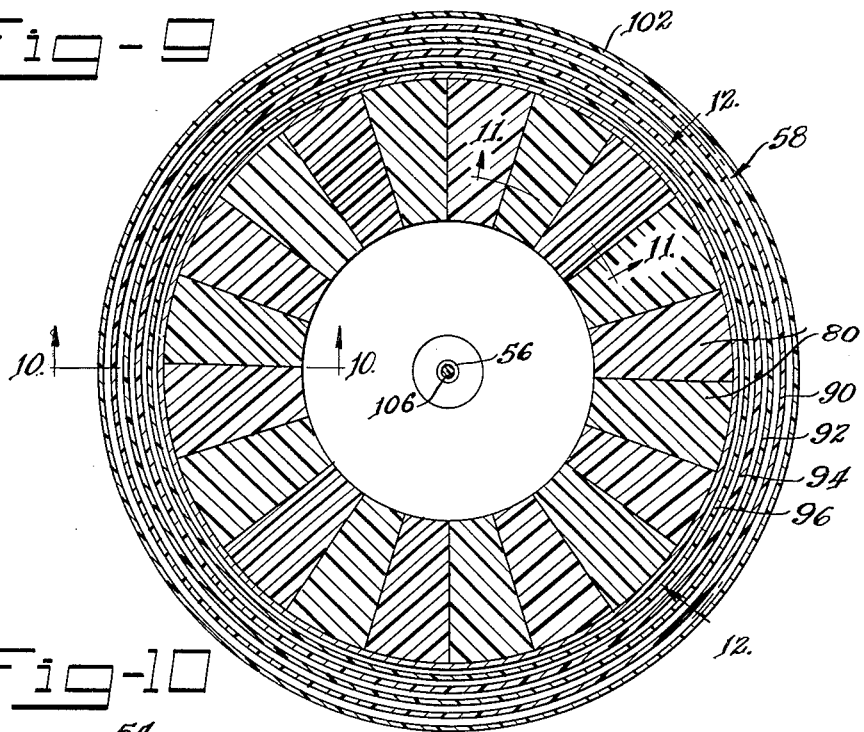
Figure 9 is a sectional view taken along the line 9—9 of Figure 8.

Figures 1 and 2 illustrate a rectangular horn 10 having a throat 12 and an aperture 14. The throat 12 of the horn 10 is connected to a source of electromagnetic signals 16, and a polarizer 18 is positioned adjacent to the aperture 14 of the horn. The horn itself is of conventional design and will not be further described.

The polarizer 18 contains two superimposed anisotropic media, first a medium 20 formed by spaced parallel electrically conducting plate shaped members 21, and a second anisotropic dielectric medium 22 formed by parallel spaced dielectric plate shaped members 23, although it is to be understood that electrical conductors may be employed in the anisotropic dielectric medium but the electrical behavior of the medium is that of spaced dielectric sheets. As will be explained hereinafter, it is not necessary to superimpose the conductor media 20 and the dielectric media 22 in the same volume, however, by superimposing these two media, a maximum of compactness is achieved.

Figure 2 is a cross section of the region which contains the two anisotropic media 20 and 22. It is assumed that the horn 10 produces linearly polarized waves, as indicated by the vector $E_1$ of Figure 3. The $y$ component, $E_y$, of this electric field will be propagated through the phase shifter 18 at a higher velocity than that of the $x$ component, $E_x$, and as a result, the emergent field will have a vector envelope 24, as illustrated in Figure 3. The electric field has thus been shifted from a linearly polarized field to an elliptically polarized field.

Considering each of the anisotropic media 20 and 22 alone in space, the phase difference introduced between the $x$ and $y$ field components within the respective media are different functions of frequency. For the dielectric medium 22, the phase difference $\beta_\epsilon$ is given by the equation $$\beta_\epsilon = \frac{(2\pi d_\epsilon)}{\lambda}(n_y - n_x)$$

where $n_y$ and $n_x$ are the maximum and minimum refractive indices of the medium, respectively, $d_\epsilon$ is the thickness of the medium, and $\lambda$ is the wave length of the incident field. The refractive indices $n_y$ and $n_x$ for the medium are independent of frequency, and hence the phase difference $\beta_e$ increases with frequency in the dielectric medium.

For the spaced conductor medium, the phase difference $\beta_w$ in the electric field introduced by a medium of thickness $d_w$ is given by $$\beta_w = \frac{(2\pi d_w)}{\lambda}(n_w - 1) + 2\tau'$$

where $n_w$ is the index of refraction for the $x$ component of the electric field, the $y$ component being unity, and $\tau'$ is the phase effect of the storage fields at the front and rear surfaces of the medium. Values of $\tau'$ are set forth in Lengyel, "Reflection and Transmission at the Surface of Metal Plate Media," Journal of Applied Physics, volume 22, No. 3, March 1951. The refractive index of the medium in the $x$ direction, $n_w$, is a function of the incident wave length and is $$n_w = \left[1 - \left(\frac{\lambda}{2a}\right)^2\right]^{1/2}$$

where $a$ is the distance between the parallel electrically conducting plates.

Both the $$\frac{(2\pi d_w)}{\lambda}(n_w - 1)$$

component and the $\tau'$ component of the phase difference are negative, and decrease in magnitude with increasing frequency, the rate of decrease being greater at the lower frequencies in the useful microwave range. The useful frequency range is further limited to wave lengths less than twice the spacing of the plates and to those greater than the spacing of the plates.

Figure 4 illustrates the relation of the frequency to the phase difference introduced for both anisotropic dielectric media and anisotropic spaced conductor media. The phase difference is plotted along the ordinate of the graph in units of $$\frac{360° \, d}{2a}$$

where $d$ is the thickness of the medium, $a$ is the distance between the electrical conducting sheets, and the frequency is given in units of $$\frac{2a}{\lambda}$$

It is to be noted that the phase difference introduced by the anisotropic metal plate medium is negative relative to that introduced by the anisotropic dielectric medium, and is given by the curve designated 26. Two curves 28 and 30 are given for anisotropic dielectric media, the curve 28 illustrating a maximum to minimum refractive index difference of 0.5, and the curve 30 illustrating a 0.4 refractive index difference.

It is apparent from Figure 4, that a nearly constant phase shift $\beta$ made up of $\beta_e - \beta_w$ may be achieved by combining an electrical conductor anisotropic media and an anisotropic dielectric media in proper proportion, the axis of minimum refractive index of the one medium coinciding with the axis of minimum refractive index of the other medium. In this manner, the effect of frequency variation on the phase shift of the polarizer 18 can be minimized.

As stated above, the anisotropic medium 20 which is formed of conductor material employs spaced parallel plates 24 of electrically conducting material. As illustrated in Figures 1 and 2, the anisotropic medium 22 is formed by parallel sheets 23 of dielectric material, and the sheets 23 are disposed normal to the plates 21. Each of the sheets 23 is formed by segments aligned in a row, the sheets being thus interrupted by the conducting plates 21. The dielectric sheets thus formed are parallel to each other and equally spaced by a distance less than $$\frac{\lambda}{4}$$

The spacing between the electrically conducting plates 21 is critical, and is given by the expression $$2a > \lambda > a$$

where $a$ is the distance between adjacent surfaces of the electrically conducting plates 21. Plates of aluminum and brass have proven satisfactory. The dielectric sheets 23 may be any of the conventional dielectrics selected for low loss for the frequencies involved. Polystyrene has proven to be a very satisfactory dielectric for this purpose.

Figures 5, 6 and 7 illustrate a modified polarizer 18a similar to the polarizer 18 in that an electrical conductor medium and an anisotropic dielectric medium is employed. The polarizer 18a may be substituted for the polarizer 18. The electric conductor medium, designated 20, is identical to that of the polarizer 18, but the dielectric medium, designated 22a, may be referred to as an artificial anisotropic dielectric medium. This medium 22a is formed by a plurality of rod shaped electrical conductors 31 having lengths shorter than a quarter wave length disposed in a three dimensional array between the plates 21 of the electrical conductor medium. The rods 31 are disposed normal to the plates 21 in a plurality of planes, and aligned in rows within each plane. For convenience of mounting, the rods 31 are secured to the surfaces of dielectric sheets 32, 34 and 36, the sheets being of low loss dielectric, such as Mylar.

As illustrated in Figure 7, the plates 21 are divided into two sections 38 and 40, and the two sections 38 and 40 are interconnected electrically and mechanically by tabs 42 and 44 which pass through apertures 46 in the dielectric sheet 34, the tabs 42 and 44 being soldered to each other to form good mechanical connections, electrical connection being unnecessary. There are also tabs 48 which pass through apertures 50 in the dielectric sheets 32 and 36 to align and secure the portions 38 and 40 of the plates 21.

In one particular construction, the phase shifter 18a was constructed with Mylar sheets 32, 34 and 36 which are 0.005 inch thick. The rods 31 were constructed of aluminum having a thickness of 0.005 inch and a width of ⅛ inch, and a length of approximately ½ inch. These rods 31 are aligned in rows and spaced from each other at their ends by approximately 1/16 inch, the rods 31 being spaced from each other in directions normal to the rows by a distance of ½ inch. The Mylar sheets 32, 34 and 36 are spaced from each other to space the rods 31 by a distance of ½ inch. The plates 21 are constructed of aluminum having a 1/32 inch thickness, and the plates are disposed parallel to each other and spaced from each other by a distance of 2 5/16 inches. The thickness of the polarizer 18a is 0.186a, where $a$ is the distance between the plate conductors 24, hence, the thickness of the polarizer is approximately 0.46 inch.

Figures 8 through 12 illustrate a circularly polarized omnidirectional antenna constructed according to the teachings of the present invention. The antenna comprises a biconical horn 52, an annular lens 54 disposed about the throat 56 of the biconical horn 52 and within the horn, and a hollow cylindrical polarizer 58 disposed coaxially about the horn 52 exterior to the annular aperture 60 thereof. The antenna is mounted upon a support mast 62 which is intended to be vertically disposed. An annular base plate 64 is secured to the mast 62 by a flange 66 and a plurality of brackets 68 which extend between the periphery of the base 64 and a flange 70 disposed upon the mast 62. The biconical horn 52 has a lower cone 72 mounted at its periphery to a lower support ring 73 which is secured about the base 64. A cylindrical wall 74 of dielectric material extends upwardly from the periphery of the lower cone 72, and this wall 74 forms the inner radome for the antenna. The biconical horn 52 also has an upper cone 76 which extends from the throat 56 of the antenna to the inner radome 74 where it is secured. An annular ring 78 is secured to the upper extremity of the inner radome 74 and to the upper cone 76, and this ring 78 serves as an upper support plate for the polarizer 58.

Figure 10:
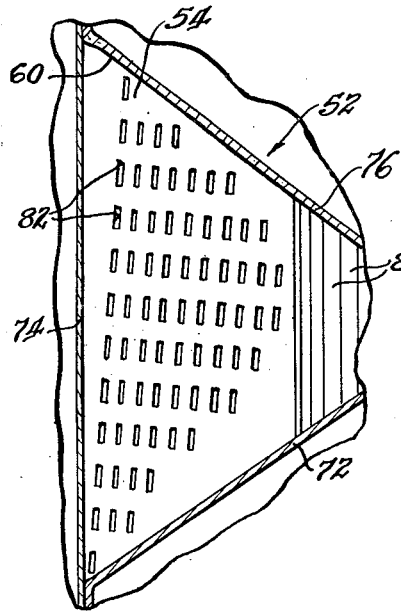
Figure 10 is a sectional view taken along the line 10—10 of Figure 9.

The lens 54 is designed to retard the propagation rate of the central component of the field of the horn and contains a plurality of sectors 80 of dielectric foam material which in total form a ring which fills the peripheral portion of the biconical horn 52. Each of the sectors 80 contain two spaced rows of slots 82, the rows being normal to the bisectoral cone of the horn 52 and extending into the sectors normally from opposite radial walls thereof. The slots 82 are equally spaced in each row, and also equally spaced from each other in equally spaced confronting coaxial orbits. A disc 84 is disposed within each slot 82, and the disc 84 is constructed of electrically conducting material, such as aluminum. In this manner, a coaxial lattice of aluminum disc 84 is disposed about the feed region or throat 56 of the horn 52, the discs 84 also being aligned on radial planes. These annular equally spaced rows are arranged coaxially about the central axis of the horn 52, and the number of annular rows adjacent to the bisectoral cone of the horn exceeds those disposed adjacent to upper and lower cones 76 and 72 to form a convex lens, as illustrated in Figures 8 and 10. The bisector of the horn is a cone in order to provide a radiation pattern with its main lobe disposed at an angle relative to the horizon. The lens 54 has been simplified in the drawings for illustrative purposes. In one particular construction, there are a total of twenty-four discs in each vertical row adjacent to the radome, and a total of twenty-two annular coaxial rows on opposite sides of the bisector cone, while the number of such coaxial rows at the upper and lower edges of the lens 24 are but two.

The phase shifter 58, or polarizer, is secured to the lower support ring 73 by an annular support member 86, and a similar annular support member 88 is secured to the upper support ring 78. Four coaxial cylinders, 90, 92, 94, and 96, are disposed about the inner radome 74 and secured at the upper and lower extremities of the support members 88 and 86, respectively. These coaxial cylinders are constructed of dielectric material and are supported by dielectric spacers 97 also in cylindrical form to maintain their relative positions.

Figure 12:
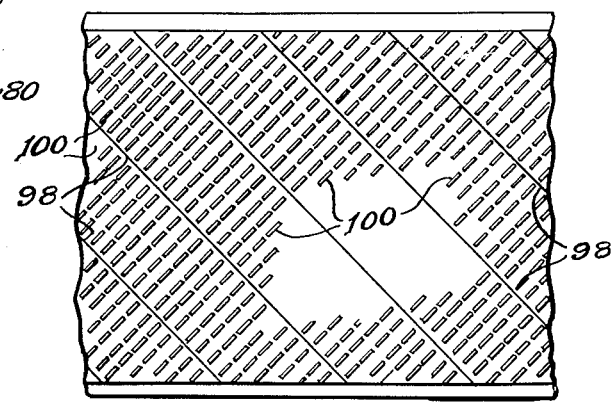
Figure 12 is a sectional view taken along the line 12—12 of Figure 9.

Figure 12 illustrates the face of each of these cylinders 90, 92, 94 and 96. A plurality of generally parallel spaced electrically conducting strips 98 extend diagonally across said cylinders, these strips 98 electrically simulating to the spaced plates of the first two embodiments of the phase shifter here disclosed. Each of the strips 98 on each of the cylinders 90, 92, 94, and 96 is aligned with strips on the other three cylinders to simulate a plate. Between the strips 98 and normal thereto are a plurality of electrically conducting bars 100, the bars 100 being aligned in rows and spaced from each other, each of the rows being equally spaced from each other row. These electrically conducting bars 100 correspond to the bars 31 of the earlier embodiments of the invention here disclosed.

An outer radome 102 extends about the dielectric sheet 90, and a cap 104 is sealed to the outer radome to protect the antenna. This outer radome 102 is also formed of a sheet of dielectric material.

The throat 56 of the biconical horn 52 is connected to a coaxial fitting 106, and a coaxial cable 108 extends from the fitting 106 to the exterior of the antenna.

A vertically polarized field is propagated outwardly from the throat 56 of the biconical antenna, and due to the fact that the bisector of the upper and lower cones 76 and 72 is itself conical in shape, the major lobe propagated from the antenna is at an angle relative to the horizon. The lens 54 is designed to reduce the curvature of the field at the aperture 60 of the antenna, and does so by retarding the portions of the field propagated through the central region of the biconical antenna. As a result of the corrective lens, the diameter of the biconical antenna is greatly reduced, thus saving space, material, and weight. Further, the diameter of the polarizer 58 is greatly reduced effecting a further savings in materials and weight.

As stated above, the biconical horn produces vertically polarized fields oriented parallel to the axis of the horn. To convert the vertically polarized fields to circular polarization, the vertical electric field vector at the aperture should be disposed at a 45° angle relative to the strips 98 which simulate the metal plate dielectric of the polarizer. In order to shift the phase of the electric field by 90° from the vertically polarized field to produce circular polarization, it is necessary to select the proper thickness for the polarizer. The required thickness may be selected and determined from the following set of equations:

$$\beta + \Delta = 360° \left(\frac{d_\epsilon}{2a}\right)(n_y - n_x)\left(\frac{f_1}{f_c}\right)$$
$$- \left[360°\left(\frac{d_w}{2a}\right)(n_{w1} - 1)\left(\frac{f_1}{f_c}\right) + 2\tau_1'\right]$$

$$\beta - \Delta = 360° \left(\frac{d_\epsilon}{2a}\right)(n_y - n_x)\left(\frac{f_a}{f_c}\right)$$
$$- \left[360°\left(\frac{d_w}{2a}\right)(n_{wa} - 1)\left(\frac{f_a}{f_c}\right) + 2\tau_a'\right]$$

$$\beta + \Delta = 360° \left(\frac{d_\epsilon}{2a}\right)(n_y - n_x)\left(\frac{f_h}{f_c}\right)$$
$$- \left[360°\left(\frac{d_w}{2a}\right)(n_{wh} - 1)\left(\frac{f_h}{f_c}\right) + 2\tau_h'\right]$$

where $\beta$ is the desired phase shift, $\Delta$ is the maximum error in degrees, $d_w$ the thickness of the metal plate anisotropic medium, $d_\epsilon$ the thickness of the dielectric anisotropic medium, $n_y$ and $n_x$ the refractive indices of the dielectric anisotropic medium in the $x$ and $y$ axis respectively, $f_1$ the low frequency operating point of the phase shifter, $f_h$ the high frequency point of operation of the phase shifter, $f_a$ an intermediate frequency equal to $$\frac{2f_1}{3} + \frac{f_h}{3}$$

and $f_c$ the frequency at which $\lambda = 2a$, $a$ being the spacing between the conducting plates of the parallel plate anisotropic medium.

Since the phase shift required to transform linear polarization to circular polarization is 90°, $\beta = 90°$ for this application, and for a frequency range of 1.55 to 1, the solution of the above equations are as follows:

$$\Delta = 2.5°$$
$$d_w = 0.186a$$
$$d_\epsilon (n_y - n_x) = 0.247a$$

For a 180° phase shift to convert vertical to horizontal polarization, these equations are solved substituting 180° for $\beta$, as follows:

$$\Delta = 5.0°$$
$$d_w = 0.604a$$
$$d_\epsilon (n_y - n_x) = 0.470a$$

In these calculations, the value of $2\tau'$ is 22.2° at $$\frac{2a}{\lambda} = 1.1$$

$(f = f_1$; 13.9° at $$\frac{2a}{\lambda} = 1.3$$

$(f=f_a)$; and 5.9° at $$\frac{2a}{\lambda} = 1.7$$

$(f=f_h)$. The first two values of $2\tau'$ are taken from the table of Lengyel, referred to above, and the latter value is an extrapolation of this table.

It is clear that in the biconical horn, the planes of the conducting strips 98 are generated by radial lines perpendicular to the antenna axis, and that the outer edge of these planes is therefore at an angle of arc $$\tan \frac{R+d}{R}$$

where R is the inner radius of the polarizer and $d$ is the thickness of the polarizer. It is thus clear that the two field components of the propagated field will also be twisted through this angular difference, however, this does not effect the circular polarization if the magnitudes and the time and position quadrature relationships are not disturbed. The spacing between the polarizer plates as simulated by the strips 98 increase from a value of $a_i$ at the inner surface of the polarizer to a value of:

$$a_0 = \frac{a_i \sin\left(\tan^{-1} 1 + \frac{d}{R}\right)}{\sin 45°}$$

For performance calculations, a mean value of plate spacing may be used if the polarizer thickness is a small fraction of its inner radius.

The range of operation of the polarizer may be extended by reducing the cutoff frequency of the metal plate medium. This may be accomplished by inserting dielectric sheets between the metal plates, as illustrated at 120 in Figure 2, the sheets 120 being illustrated by dotted lines disposed between each of the plates 21. As is well known in the wave guide art, the use of dielectric sheets through the central portions of a wave guide reduces the cutoff frequency. The same effect may be achieved by employing an artificial dielectric between the conducting plates 21. As illustrated by dotted lines in Figure 5, rods 122 shorter than a quarter wave length disposed parallel to the electrically conducting sheets may be disposed in the central region between the conducting plates to increase the band of the polarizer. These rods 122 are virtually identical to the rods 31 but oriented normal thereto. Further, the rods 122 may cross and contact the rods 30. As a result, the conductors disposed centrally between the conducting plates 21 may be in the form of discs, such as illustrated at 124 in Figure 5 with diameters less than a quarter wave length. In like manner, other geometrical shapes may be employed, as long as the length in the directions parallel and normal to the conducting plates are less than a quarter wave length.

From the foregoing disclosure, those skilled in the art will readily devise many modifications from the structure herein disclosed. It is therefore intended that the scope of the present invention be not limited to the foregoing disclosure, but rather only by the appended claims.

The invention claimed is:

1. A microwave antenna comprising, in combination, a horn defining a path for microwaves having a throat adapted to be connected to a source of microwaves at one end and an aperture at the other end, and a polarizer disposed in the path of the microwaves having a first and second phase shifting medium disposed in the path of the microwaves, the first phase shifting medium being characterized by a phase velocity for waves polarized in a first plane substantially the same as the phase velocity in free air, and a phase velocity substantially lower for waves polarized in a second plane normal to the first plane, the second phase shifting medium being characterized by a phase velocity for waves polarized in the second plane substantially the same as the phase velocity in free air, and a phase velocity substantially greater for waves polarized in the first plane, the difference in the magnitude of the phase shift between the first and second planes decreasing with frequency in the first medium and increasing with frequency in the second medium, whereby the phase shift produced by the polarizer is relatively constant over a greater frequency range than achieved with either phase shifting medium alone.

2. A microwave antenna comprising the elements of claim 1 wherein the second phase shifting medium comprises a plurality of spaced parallel dielectric sheets disposed parallel to the first plane.

3. A microwave antenna comprising the elements of claim 1 wherein the second phase shifting medium comprises a lattice of elongated electrical conductors having lengths less than a quarter wave length, said lattice having a plurality of rows of conductors disposed on common axes spaced from each other by a distance less than a quarter wave length, the rows of said conductors being disposed parallel to each other and spaced from adjacent rows by distances less than a quarter wave length, and said conductors being parallel to the first plane.

4. A microwave antenna comprising the elements of claim 1 wherein the second phase shifting medium comprises a plurality of parallel dielectric sheets disposed normal to the microwave path and spaced from each other by a distance less than a quarter wave length, a plurality of rod-shaped electrical conductors secured to each of the sheets on parallel equidistant axes, said rods being less than a quarter wave length long and spaced by a distance less than a quarter wave length, the axes being spaced from each other by a distance less than a quarter wave length and being parallel to the first plane.

5. A microwave antenna comprising the elements of claim 1 wherein the first phase shifting medium comprises a plurality of parallel plates of electrically conducting material disposed parallel to the path of the waves and spaced from each other by a distance between one-half and one wave length, said plates being parallel to the second plane.

6. A microwave antenna comprising the elements of claim 1 wherein the first phase shifting medium comprises a plurality of parallel dielectric sheets disposed normal to the path of the waves and equally spaced from each other by a distance less than a quarter wave length, and a plurality of parallel strips of electrically conducting material secured to each sheet, said strips being equally spaced from each other by a distance between one-half and one wave length, the strips on adjacent sheets being aligned on planes parallel to the path of the waves and parallel to the second plane.

7. A microwave antenna comprising, in combination, a horn defining a path for microwaves having a throat adapted to be connected to a source of microwaves at one end and an aperture at the other end, and a polarizer disposed in the path of the microwaves having a plurality of parallel dielectric sheets disposed normal to the microwave path and spaced from each other by a distance less than a quarter wave length, a plurality of rod shaped electrical conductors secured to each of the sheets on parallel equidistant axes, the axes being spaced from each other by a distance less than a quarter wave length, and a plurality of parallel strips of electrically conducting material secured to each of the sheets normal to the rows of rod shaped electrical conductors, said strips being electrically insulated from the rod shaped conductors and equally spaced from each other by a distance between one-half and one wave length.

8. A microwave antenna comprising the elements of claim 1 wherein the first phase shift medium comprises a plurality of parallel plates of electrically conducting material disposed parallel to the path of the microwaves and spaced from each other by a distance of one-half to one wave length, and a dielectric slab disposed centrally between each pair of confronting plates and parallel thereto, said slab being spaced from the plates.

9. A microwave antenna comprising the elements of claim 1 wherein the first phase shifting medium comprises a plurality of parallel dielectric sheets disposed normal to the path of the waves and equally spaced from each other by a distance less than a quarter wave length, a plurality of parallel strips of electrically conducting material secured to each sheet, said strips being equally spaced from each other by a distance between one-half and one wave length, and at least one row of rod shaped conductors having lengths less than a quarter wave length disposed between each of the electrically conducting strips centrally and parallel thereto, each of said rows having a plurality of said rod shaped conductors equally spaced from adjacent conductors.

10. A microwave antenna comprising in combination, a biconical horn having a pair of confronting generally conical electrically conducting members forming a cylindrical aperture between the peripheries of the members, and a cylindrical polarizer disposed adjacent to the cylindrical aperture having a first and a second cylindrical phase shifting medium disposed coaxially of the biconical horn, the first phase shifting medium being characterized by a phase velocity substantially the same as the phase velocity in free air for waves polarized in a first family of planes intersecting the bisector cone of the biconical horn along radii thereof and at the same acute angle thereto, and a phase velocity substantially lower for waves polarized in a second family of planes intersecting the bisector cone of the biconical horn along radii thereof at complementary angles to the planes of the first family of planes, the second phase shifting medium being characterized by a phase velocity for waves polarized in the planes of the second family of planes substantially the same as the phase velocity in free air, and a phase velocity substantially greater for waves polarized in the planes of the first family of planes, the difference in the magnitude of the phase shift between the first family of planes and the second family of planes in the first medium decreasing with frequency and increasing with frequency in the second medium, whereby the phase shift produced by the polarizer is relatively constant over a greater frequency range achieved with either phase shifting medium alone.

11. A microwave antenna comprising the elements of claim 10 wherein the second medium comprises a plurality of coaxial cylinders of dielectric material, and a lattice of rod shaped electrical conductors secured to the surfaces of the cylinders, the conductors being disposed on planes of the first family having lengths less than a quarter wave length, and each conductor being spaced from adjacent conductors by less than a quarter wave length.

12. A microwave antenna comprising the elements of claim 10 wherein the first medium comprises a plurality of coaxial cylinders of dielectric material, a plurality of equally spaced strips of electrically conducting material disposed on the surface of each cylinder in planes of the second family, each strip being aligned with a strip on each other dielectric cylinder forming a row of strips spaced at intervals less than a quarter wave length.

13. A polarizer comprising a first and a second phase shifting medium for transmitting an electrical wave along an axis, the first phase shifting medium being characterized by a phase velocity for waves polarized in a first plane substantially the same as the phase velocity in free air, and a phase velocity substantially lower for waves polarized in a second plane normal to the first plane, the second phase shifting medium being characterized by a phase velocity for waves polarized in the second plane substantially the same as the phase velocity in free air, and a phase velocity substantially greater for waves polarized in the first plane, the difference in the magnitude of the phase shift between the first and second planes decreasing with frequency in the first medium and increasing with frequency in the second medium, whereby the phase shift produced by the polarizer is relatively constant over a greater frequency range than achieved in either phase shifting medium alone.

14. A microwave antenna comprising a biconical horn having a pair of confronting generally conical electrically conducting members forming a cylindrical aperture between the peripheries of the members, and a cylindrical polarizer disposed adjacent to the aperture characterized by the construction of claim 13.

15. A polarizer for microwaves comprising the elements of claim 13 wherein the thickness of the first medium approximately equals the thickness of the second medium, and the second medium is superimposed on the first medium.

References Cited in the file of this patent

UNITED STATES PATENTS

| | | |
|---|---|---|
| 2,438,119 | Fox | Mar. 23, 1948 |
| 2,554,936 | Burtner | May 29, 1951 |
| 2,577,619 | Kock | Dec. 4, 1951 |
| 2,579,324 | Kock | Dec. 18, 1951 |
| 2,588,249 | Kock | Mar. 4, 1952 |
| 2,599,896 | Clark et al. | June 10, 1952 |
| 2,608,656 | Korman | Aug. 26, 1952 |
| 2,785,397 | Rust et al. | Mar. 12, 1957 |
| 2,800,657 | Weil et al. | July 23, 1957 |
| 2,850,705 | Chait et al. | Sept. 2, 1958 |

FOREIGN PATENTS

| | | |
|---|---|---|
| 665,747 | Great Britain | Jan. 30, 1952 |

OTHER REFERENCES

"Circularly-Polarized Biconical Horns," by Goatley et al., IRE Transections on Antennas and Propagation, vol. AP-4, No. 4, October 1956, pages 592 to 596.